United States Patent
Barbieri et al.

(10) Patent No.: US 9,497,751 B2
(45) Date of Patent: Nov. 15, 2016

(54) METHODS TO ENHANCE NEIGHBOR PDCCH DECODING BY EXPLOITING CORRELATION OF RNTIS

(71) Applicant: QUALCOMM Incorporated, San Diego, CA (US)

(72) Inventors: Alan Barbieri, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 14/318,494

(22) Filed: Jun. 27, 2014

(65) Prior Publication Data

US 2015/0009905 A1 Jan. 8, 2015

Related U.S. Application Data

(60) Provisional application No. 61/842,374, filed on Jul. 2, 2013.

(51) Int. Cl.
*H04W 72/04* (2009.01)
*H04W 72/08* (2009.01)
*H04L 1/00* (2006.01)
*H04L 5/00* (2006.01)

(52) U.S. Cl.
CPC .......... *H04W 72/042* (2013.01); *H04L 1/0046* (2013.01); *H04L 1/0072* (2013.01); *H04W 72/085* (2013.01); *H04L 5/0053* (2013.01)

(58) Field of Classification Search
CPC ............... H04W 72/042; H04W 72/085; H04L 1/0038; H04L 1/0072; H04L 1/0046
See application file for complete search history.

(56) References Cited

U.S. PATENT DOCUMENTS

| 8,144,664 B2 | 3/2012 | Pani et al. |
| 8,625,516 B2 | 1/2014 | Lindoff et al. |
| 8,655,360 B2 | 2/2014 | Xu et al. |
| 2011/0116428 A1 | 5/2011 | Seong et al. |

(Continued)

OTHER PUBLICATIONS

International Search Report and Written Opinion—PCT/US2014/044931—ISA/EPO—Dec. 18, 2014.

*Primary Examiner* — Pao Sinkantarakorn
*Assistant Examiner* — Michael Phillips
(74) *Attorney, Agent, or Firm* — Arent Fox LLP

(57) ABSTRACT

Network identifiers used for control information are typically correlated in time. This correlation in time may be leveraged to reduce the control space searched, and thus the number of blind decodes performed by a UE during blind decoding of neighbor cell control information. An apparatus that exploits this correlation in time decodes a control channel transmitted by a neighbor cell to obtain a current network identifier used to perform an operation on the control channel transmission, compares the current network identifier with a set of network identifiers obtained from previously decoded control channels transmitted from the neighbor cell, and determines if the decoded control channel is valid based at least in part on the comparison. The set of network identifiers may be a list of network identifiers, or a range of network identifiers. The set of network identifiers may further include aggregation level information and frequency of occurrence information.

24 Claims, 13 Drawing Sheets

(56) References Cited

U.S. PATENT DOCUMENTS

| | | | |
|---|---|---|---|
| 2012/0190377 A1* | 7/2012 | Li | H04L 1/0061 455/452.1 |
| 2012/0281667 A1* | 11/2012 | Chang | H04L 5/001 370/329 |
| 2013/0003569 A1* | 1/2013 | Lindoff | H04L 1/0045 370/252 |
| 2013/0005269 A1 | 1/2013 | Lindoff et al. | |
| 2013/0121168 A1 | 5/2013 | Luo et al. | |
| 2013/0155872 A1 | 6/2013 | Subramanian et al. | |
| 2013/0155981 A1 | 6/2013 | Kitazoe | |
| 2013/0294547 A1 | 11/2013 | Lane et al. | |

* cited by examiner

METHODS TO ENHANCE NEIGHBOR PDCCH DECODING BY EXPLOITING CORRELATION OF RNTIS

CROSS-REFERENCE TO RELATED APPLICATION(S)

This application claims the benefit of U.S. Provisional Application Ser. No. 61/842,374, entitled "Methods to Enhance Neighbor PDCCH Decoding by Exploiting Correlation of RNTIS" and filed on Jul. 2, 2013, which is expressly incorporated by reference herein in its entirety.

BACKGROUND

Field

The present disclosure relates generally to communication systems, and more particularly, to a method to enhance neighbor control channel decoding by exploiting correlation of network identifiers.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Control information for a particular UE is encoded according to a network identifier, such as a radio network temporary identifier (RNTI), which is a number that provides the identity of a UE. A UE, however, may need to decode interfering control information from a neighbor cell. In this case, the particular UE is not aware of the identities of all the UEs served by the neighbor cell. Accordingly, the particular UE searches the whole control space for decode interfering control information. An increased search space requires a large number of blind decodes, which leads to increased complexity, potentially unfavorable false alarm probability (FAP) and misdetection probability (MDP).

Network identifiers used for control information are typically correlated in time. Accordingly, if an eNB of a neighbor cell schedules a specific UE in a subframe, the eNB will likely reschedule the same UE in a same subframe. The identifiers being used in a same time frame are typically a small subset of the total number of identifiers available. Implementations described below exploit this network identifier correlation in time to enhance decoding of control information transmitted by neighbor cells.

In one implementation, an apparatus decodes a control channel transmitted by a neighbor cell to obtain a current network identifier used to perform an operation on the control channel transmission. The apparatus compares the current network identifier with a set of network identifiers obtained from previously decoded control channels transmitted from the neighbor cell, and determines if the decoded control channel is valid based at least in part on the comparison. The set of network identifiers may be a list of network identifiers, or a range of network identifiers. The set of network identifiers may further include aggregation level information and frequency of occurrence information.

DETAILED DESCRIPTION

Figure 1:
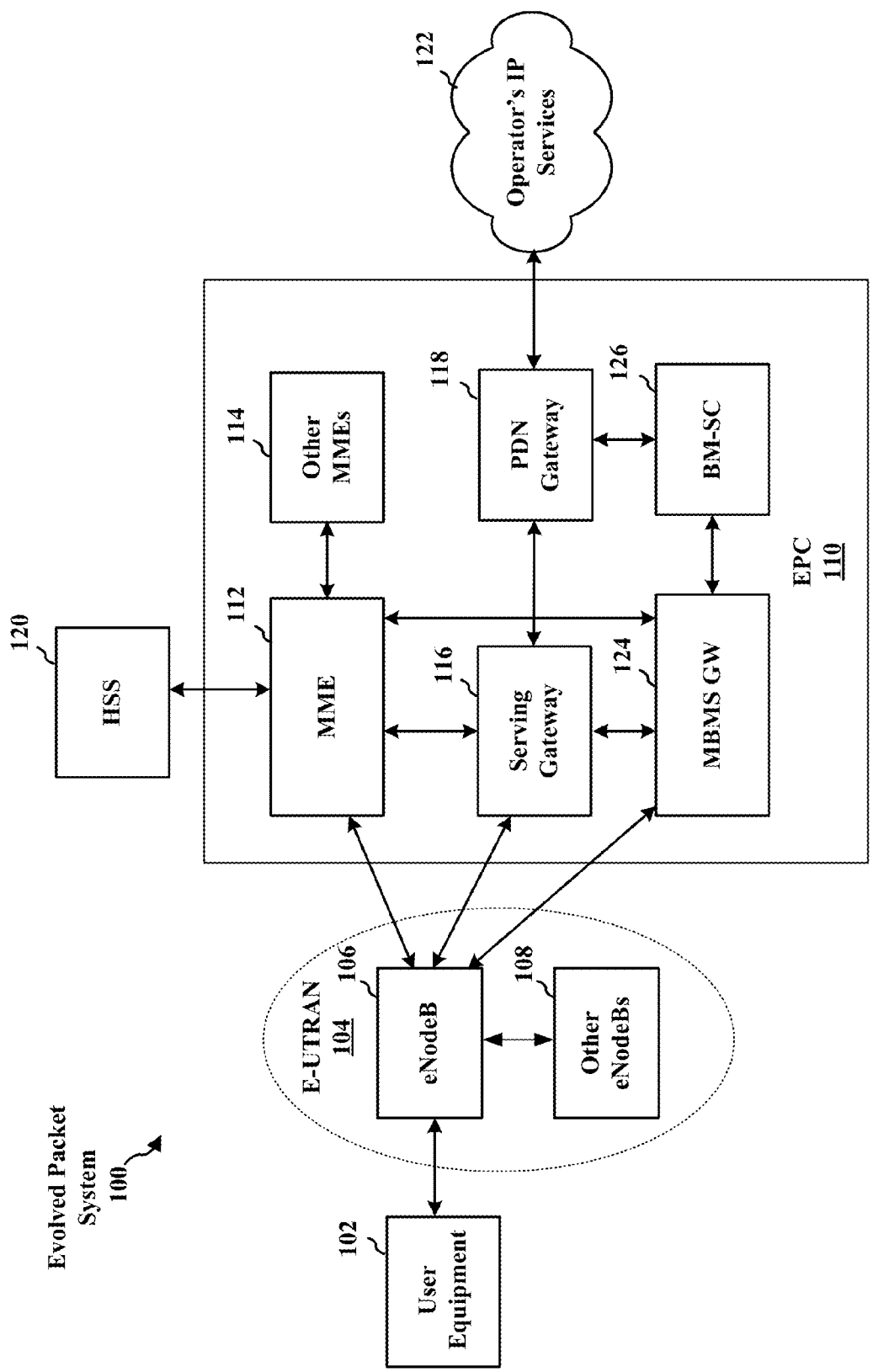
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
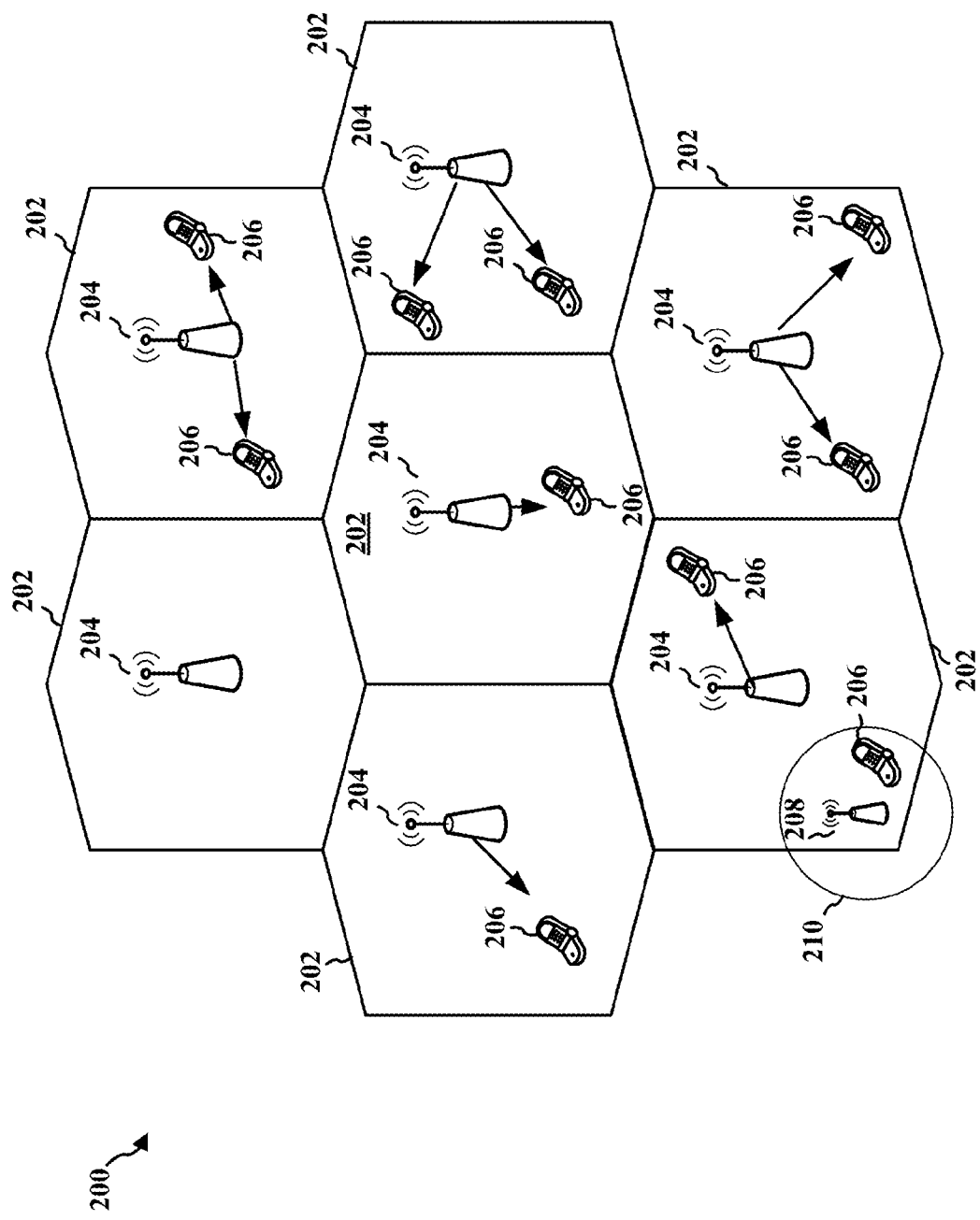
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
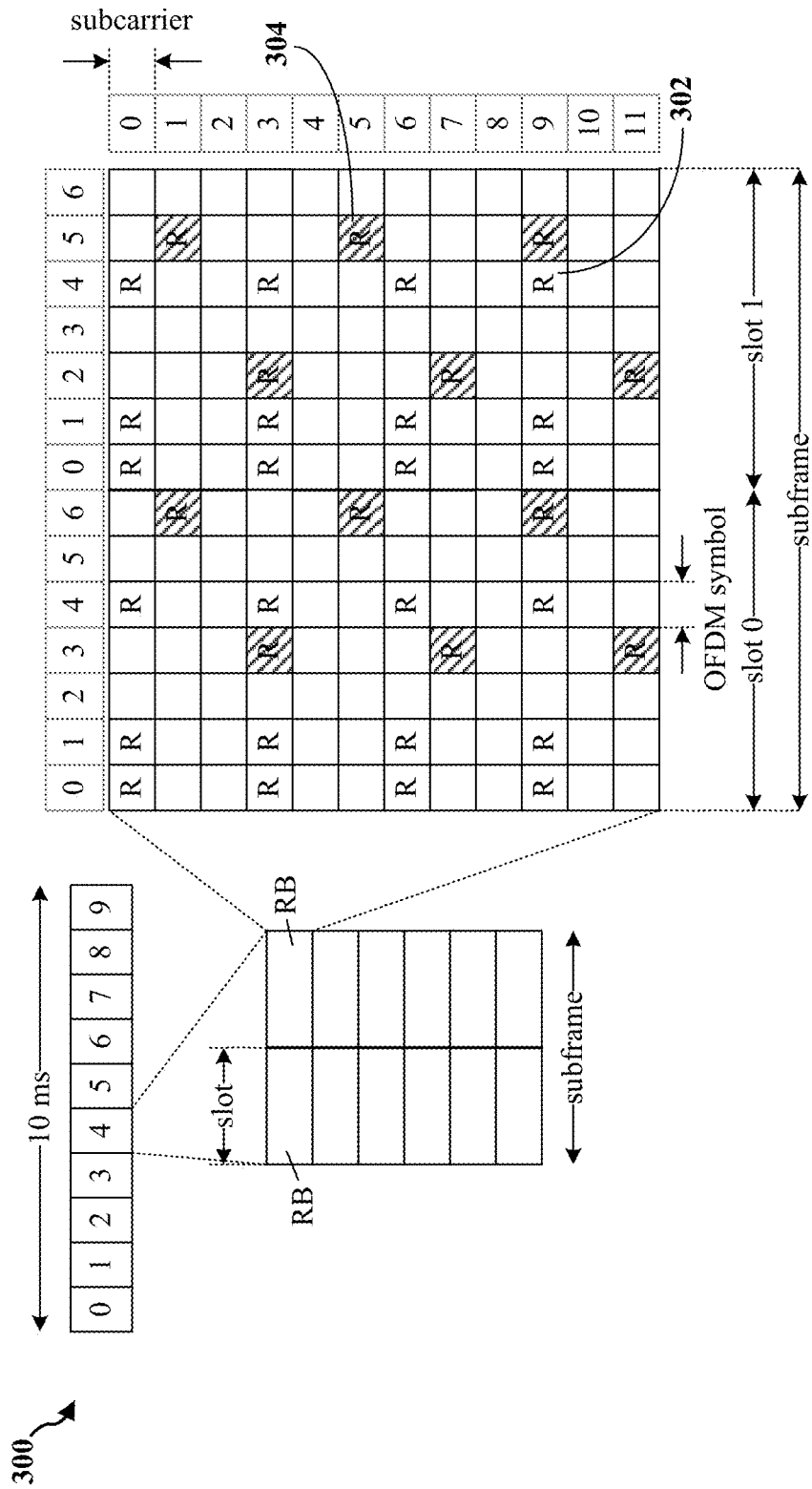
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
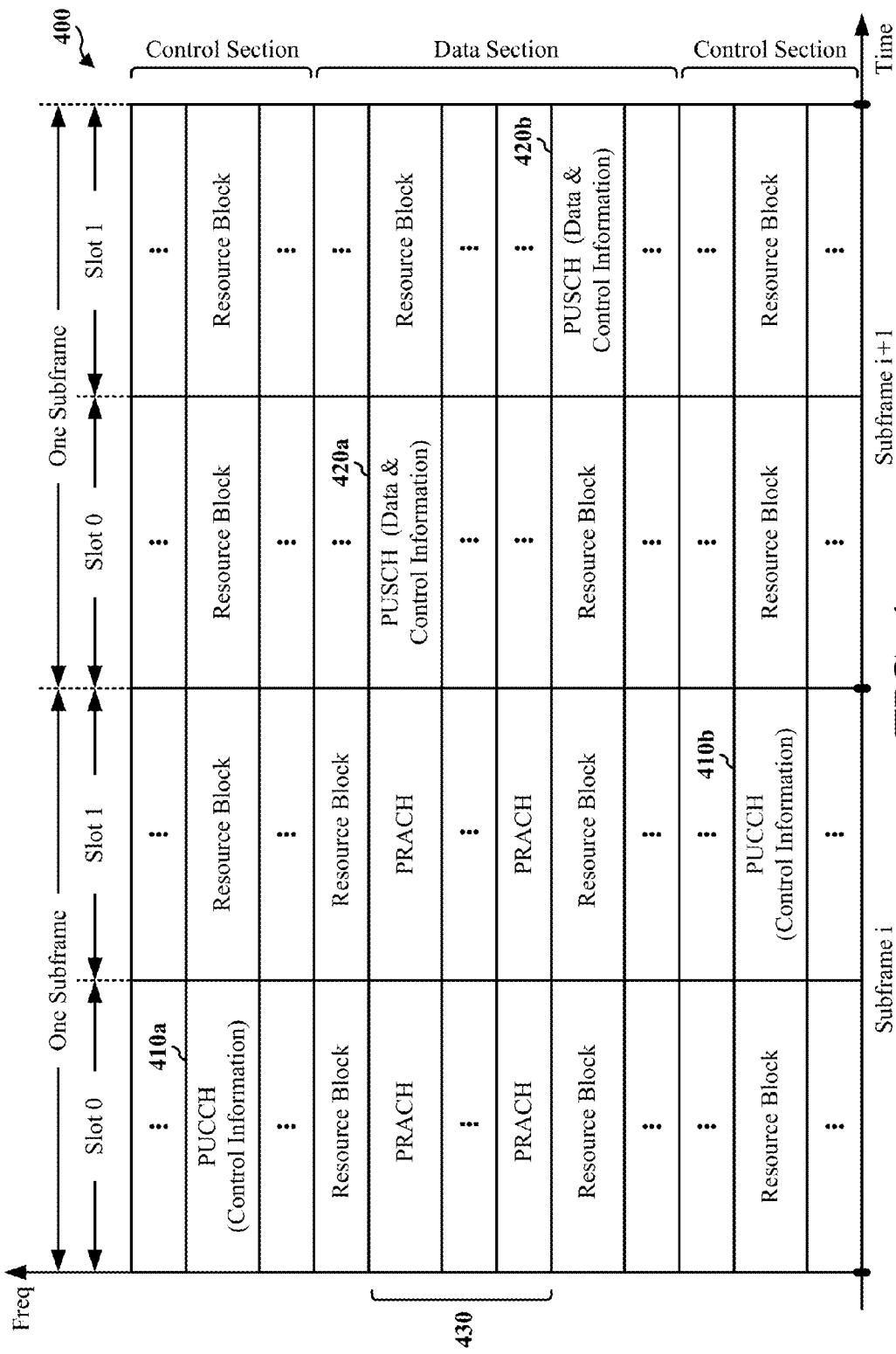
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
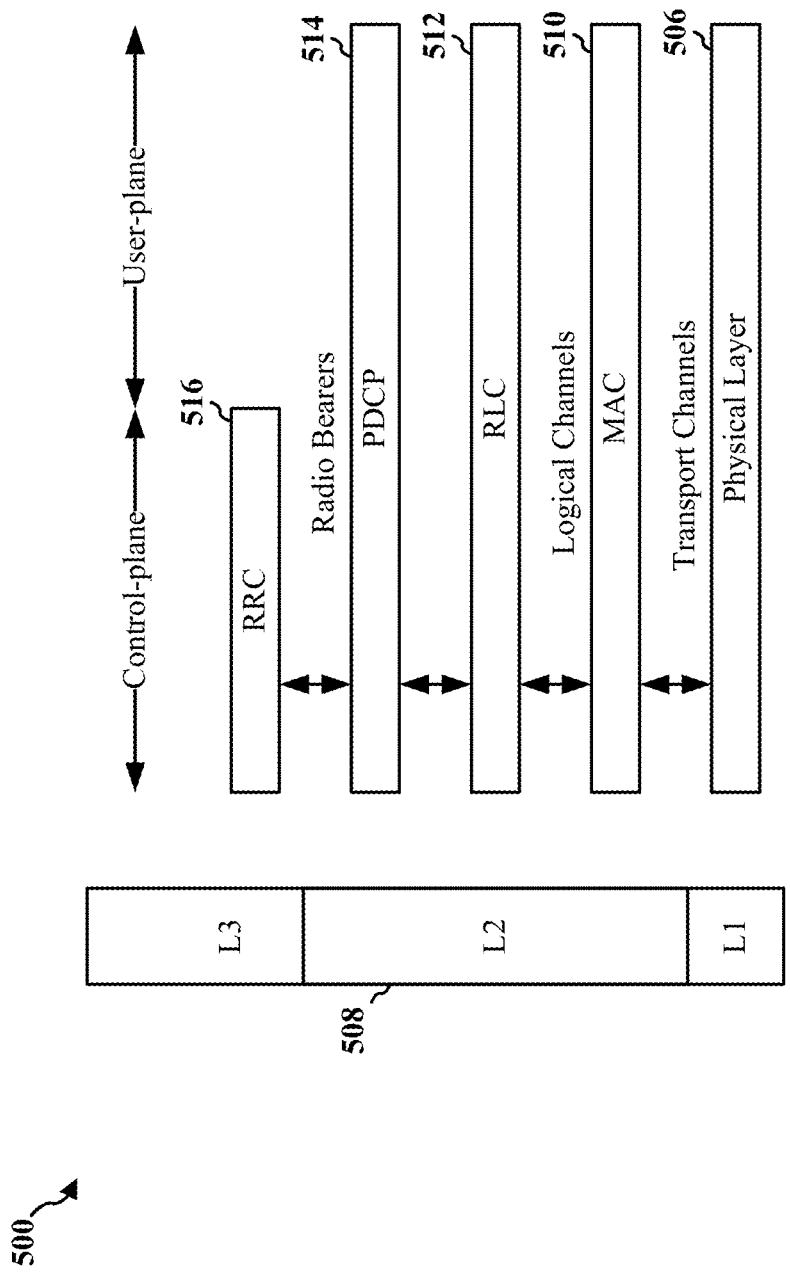
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
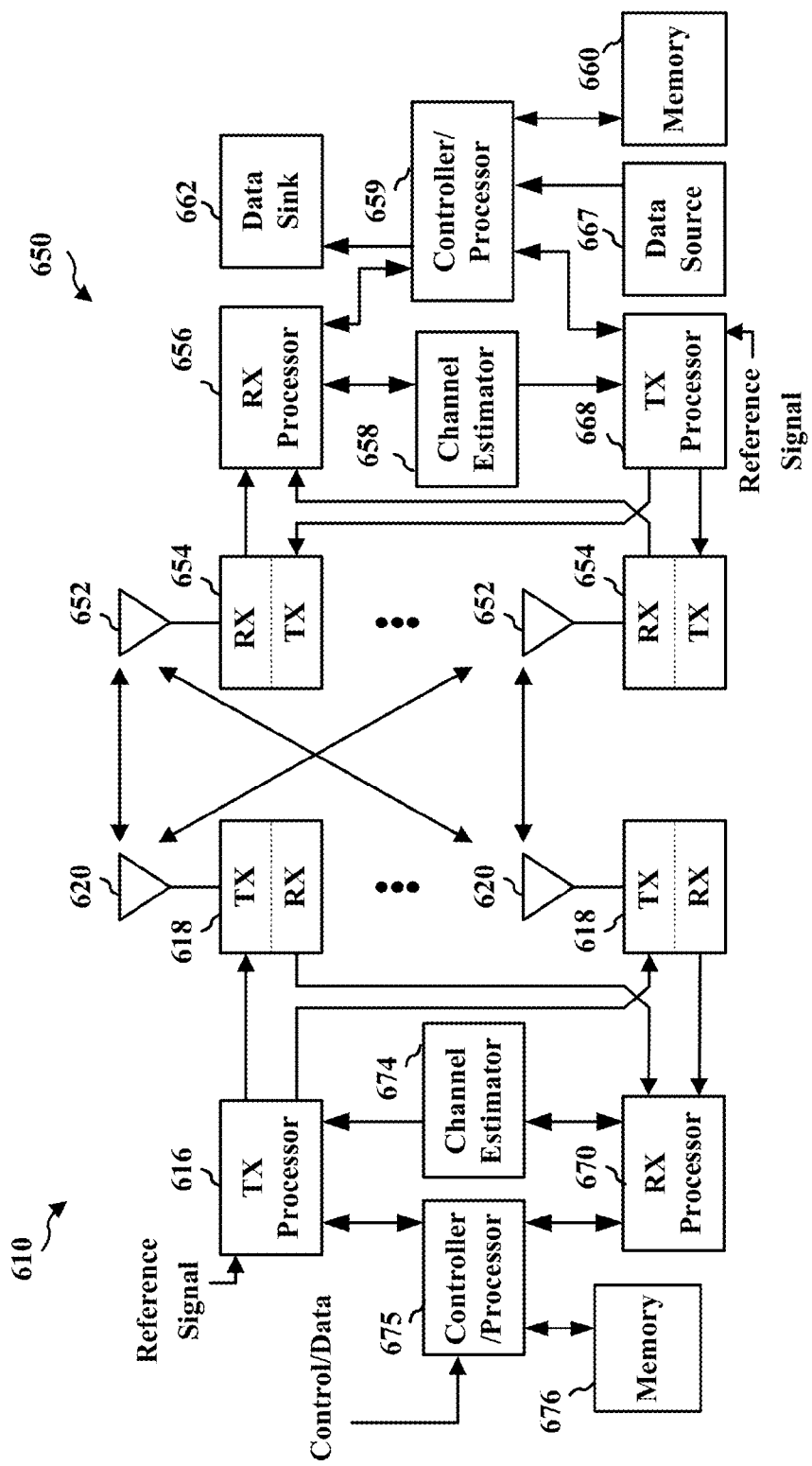
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Control information for a particular UE is encoded according to a radio network temporary identifier (RNTI), which is a number that provides the identity of a UE. Based on its RNTI, a particular UE knows which resource elements within a subframe to search for its own control information. A UE, however, may need to decode interfering control information from a neighbor cell. The neighbor cell transmits control information for different UEs at the same time, and each UE has its own RNTI. In this case, the particular UE is not aware of the identities of all the other UEs. Accordingly, in order to decode control information from the neighbor cell, the particular UE performs blind decoding.

Blind decoding of neighbor cell control information encoded in a physical downlink control channel (PDCCH) is complex because RNTIs used by neighbor eNB are unknown. Lack of knowledge of RNTI implies that the search space is unknown. The search space is a function of the RNTI and since the particular UE does not know the RNTIs of the UEs served by the neighbor cell, the particular UE searches the whole control space. An increase search space requires a large number of blind decodes, which leads to increased complexity, potentially unfavorable false alarm probability (FAP) and misdetection probability (MDP).

In networks, RNTIs used for control information are typically correlated in time. This is because there are typically a finite number of UEs active at the same time. Accordingly, if an eNB of a neighbor cell schedules a specific UE in a subframe, the eNB will likely reschedule the same UE is a same subframe. The RNTIs being used in a same time frame (e.g., 10 to 100 milliseconds) are typically a small subset of the total number of RNTIs available. Implementations described below exploit this RNTI correlation in time to enhance decoding of control information transmitted by neighbor cells.

Figure 7:
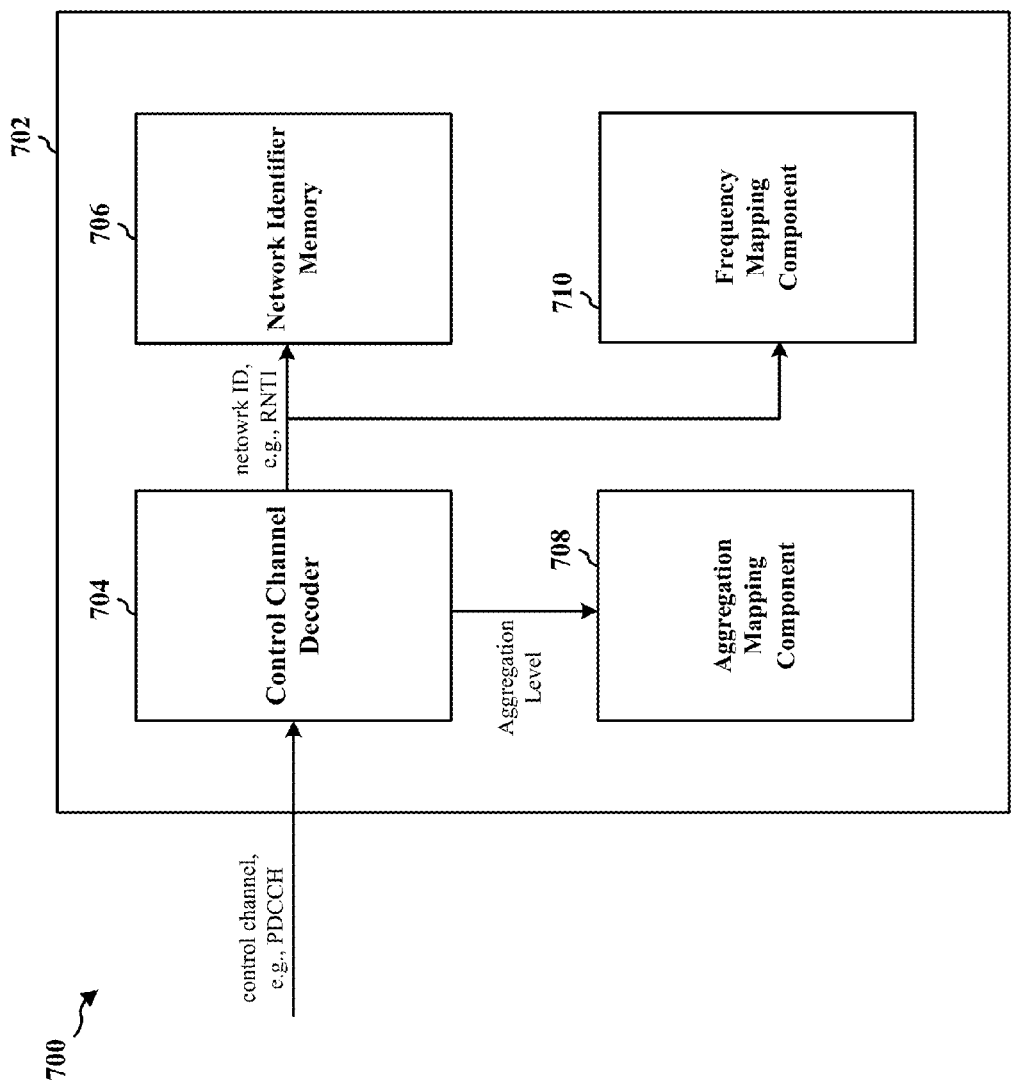
FIG. 7 is a diagram illustrating a UE configured to provide enhanced neighbor control channel decoding.

FIG. 7 is a diagram 700 illustrating a UE 702 configured to provide enhanced neighbor control channel decoding. The UE 702 may include a control channel decoder 704, a network identifier memory 706, an optional aggregation mapping component 708 and an optional frequency mapping component 710.

The control channel decoder 704 receives and decodes control channels transmitted by a neighbor cell. The decoder 704 extracts a current network identifier from the control channel. In an example implementation, the control channel is a PDCCH and the extracted network identifier is an RNTI associated with the PDCCH. The decoder 704 maintains a list of decoded PDCCHs and associated RNTI values.

The network identifiers, e.g., RNTI values, extracted from the information in the control channel, e.g., PDCCH, are collected and stored in the network identifier memory 706. The network identifier memory 706 may be, for example, a FIFO queue of limited size. When a PDCCH is received and decoded, the associated RNTI value is extracted and stored (or restored) in the queue. Over time, the queue may become full. Accordingly, if a particular RNTI value is not decoded for some time, that particular RNTI will fall out of the queue. The size of the queue (i.e., forgetting factor) may be a design parameter that controls the life of a RNTI value that has not been recently decoded remains in the network identifier memory 706. If storing RNTI values takes too much memory, dimensionality can be reduced by designing a hashing function and storing the hash values.

The network identifiers stored in the memory form a set of network identifiers. Over time, the UE constructs this set of network identifiers based on network identifiers obtained from previously decoded control channels transmitted from the neighbor cell. As described above, such construction involves the addition of a network identifier as it is extracted and the removal of a network identifier when that identifier is not associated with any of the decoded control channels transmitted from the neighbor cell, for a predefined period of time, through a certain number of decoding iterations, or upon the inclusion of a certain number of new identifiers.

Each network identifier value may have a time aspect associated therewith. The time aspect may be provided via a FIFO queue, which implicitly embeds time information, since older, previously stored network identifiers fall out of the queue in favor of newer, more recently stored network identifiers. Alternatively, the time aspect may be provided explicitly by associating a timestamp with each network identifier value and updating the timestamp every time that network identifier value is decoded. This time aspect may be relevant when a different structure, other than a FIFO queue, is used to store network identifiers. For example, if the network identifiers are stored in ascending order, then a timestamp for each network identifier is stored. An ascending storage structure may be beneficial in that it may allow for efficient searches, since searching among sorted network identifier values has lower complexity.

In another configuration, the set of network identifiers may correspond to a range of network identifiers. If the neighbor eNB assigns consecutive RNTIs to its UEs, it may be possible for the UE to estimate the range of likely valid RNTIs, rather than storing each detected RNTI value in a list of values. Whether the eNB effectively assigns RNTIs sequentially from a range rather than selecting them in a pseudo-random fashion, may be known in advance (e.g., via NAIC) or blindly detected by the UE. In this case, the network identifier memory 706 may store RNTI values as a range of RNTI values. For example, the UE may estimate a range of RNTIs and store a minimum RNTI value and a maximum RNTI value that define the range.

As described further below, the set of network identifiers may include additional information derived from the control signals. For example, the control channel decoder 704 may determine an aggregation level for each of the network identifiers extracted from a control channel. These aggregation levels may be stored in the aggregation mapping component 708. The aggregation mapping component 708 associates each of the network identifiers stored in the network identifier memory 706 with an aggregation level.

The aggregation mapping component 708 may be updated over time, in parallel with the updating of the network identifier memory 706. For example, if a particular RNTI values falls out of the queue of network identifiers, the aggregation level associated with that particular RNTI will be removed from the aggregation mapping component 708. Alternatively, if the aggregation level associated with a certain network identifier changes, that change will be updated in the aggregation mapping component 708.

Another type of information derived from control signals relates to the frequency of occurrence of network identifiers. The control channel decoder 704 provides network identifier information, e.g., RNTI values, to the frequency mapping component 710. The frequency mapping component 710 processes the information to derive a corresponding frequency of occurrence of network identifiers, e.g., a histogram. For example, the frequency mapping component 710 may include a counter associated with each particular network identifier that increments each time an instance or occurrence of a particular network identifier is added to the network identifier memory 706, and decrements each time an instance or occurrence of the particular network identifier is removed from the memory. The frequency mapping component 710 associates each of the network identifiers stored in the network identifier memory 706 with a frequency. The frequency mapping component 710 may be updated over time, in parallel with the updating of the network identifier memory 706. If a particular instance of an RNTI value is added to the queue of network identifiers, the frequency count stored in the frequency mapping component 710 and associated with that particular RNTI, is increased by one. Alternatively, if a particular instance of an RNTI value falls out of the queue of network identifiers, the frequency count associated with that particular RNTI is reduced by one.

Figure 8:
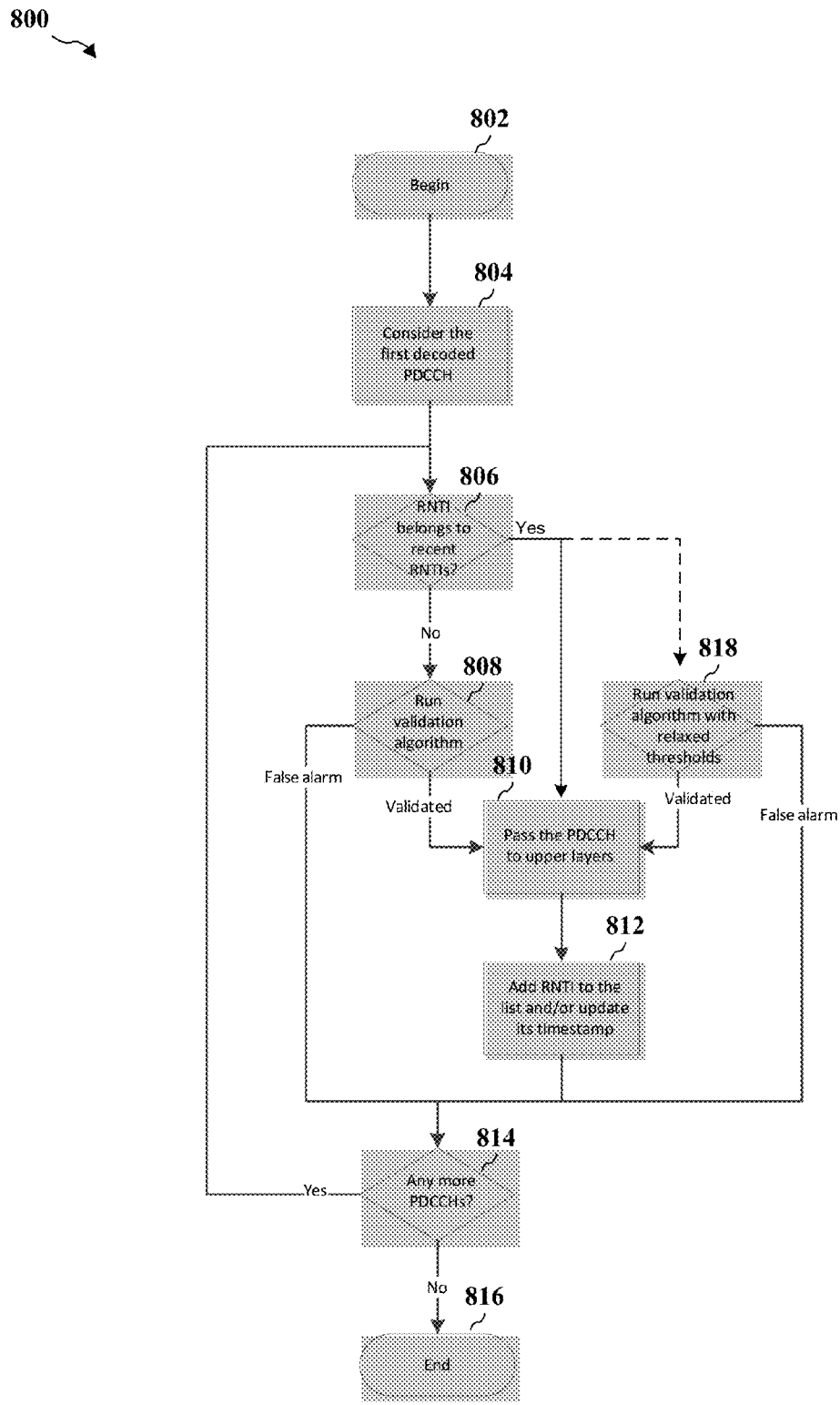
FIG. 8 a flow chart of a method of validating control channel signals within the context of an LTE communication network.

FIG. 8 is a flow chart 800 of a method of validating control channel signals within the context of an LTE communication network, where the control channel is a PDCCH and the extracted network identifier is an RNTI. The method may be performed by a UE.

At step 802 the validation process begins.

At step 804, the UE considers the first decoded PDCCH. For example, the UE may extract the RNTI value from the PDCCH.

At step 806, the UE checks if the current RNTI extracted from the PDCCH is in the current set of network identifiers, e.g., the list of RNTI values stored in the network identifier memory 704. Thus, the UE determines if the currently decoded RNTI was recently found in a previous subframe. In one implementation, the UE may check the queue in the network identifier memory 704 to determine if the current RNTI is in the queue. Alternatively, the network identifier memory 704 may store the set of network identifier in an additional form, such as in ascending order, as described above, or a stack (LIFO). In the latter implementation, the UE may check the stack so that the most recent network identifiers are compared first and the older ones last. As described above, the set of network identifiers may be a range of network identifiers. In this case, the UE compares the current RNTI value to the range to determine if the current RNTI value falls within the range.

If the current RNTI value is not in the list of RNTI values or is outside the range of RNTI values, the UE determines whether the current PDCCH is valid or a false alarm. Even though the current RNTI value is not in the RNTI value list, the PDCCH may be valid, for example, if the RNTI is associated with a new UE that just entered the system. Accordingly, the UE, at step 808 runs a validation algorithm on the PDCCH, wherein the validation algorithm has an associated heightened thresholds, as described further below.

If, at step 808, the algorithm determines that the PDCCH is valid, then at step 810, the UE passes the PDCCH to upper layers for further processing. If, at step 808, the algorithm determines that the PDCCH is not valid, i.e., it is a false alarm, then the UE proceeds to step 814.

Thereafter, at step 812, the UE adds the RNTI value to the set of network identifiers and/or updates the timestamp of the RNTI value.

At step 814, the UE determines if there are anymore PDCCHs to process. If there are one or more additional PDCCHs, the UE returns to step 806 and repeats the process for the next PDCCH. If there are no additional PDCCHs, then the process ends at step 816.

If, at step 806, the UE determines that the current RNTI value is in the list of RNTI values or falls within the range of RNTI values, then the UE may conclude that the PDCCH is valid, and accordingly may proceed directly to step 810. Alternatively, in another embodiment, of step 806, if the UE determines that the current RNTI value is in the list of RNTI values or falls within the range of RNTI values, then the UE may proceed to step 818.

At optional step 818, the UE runs a validation algorithm having relaxed thresholds. The use of relaxed threshold is justified because the RNTI and PDCCH is highly likely to be valid since it corresponds to a previously decoded RNTI or a RNTI within the valid range of RNTI values.

In one example validation algorithm, measurements are derived from information extracted from a data region. Initially, a statistical measure of variance in the measurements across the data region is obtained. If the statistical measure is indicative of substantially constant measurements across the data region, then the algorithm concludes the control channel is valid. If the statistical measure is indicative of varying, e.g., oscillating, measurements across the data region, then the algorithm concludes the control channel is invalid, i.e., is a false alarm. In one implementation, the validation algorithm measures traffic to power ratio (TPR) and the measured data region corresponds to resource block locations in a subframe.

In one configuration, the validation algorithm may conclude validity based on a comparison of the statistical variance measurement to a threshold. In accordance with the process of FIG. 8, the algorithm may use different thresholds under different circumstances. For example, if the UE identifies an RNTI value extracted from a PDCCH is not in the set of network identifiers, then the PDCCH may be valid or a false alarm. Accordingly, at step 808, the algorithm may employ a first threshold level that requires a statistical measure corresponding to a higher degree of consistency among data region measurements. If the UE determines a PDCCH is likely to be valid because an RNTI value is in the set of network identifiers, then at step 818, the validation algorithm may have a second threshold level that requires a statistical measure corresponding to a lower degree (relative to the aforementioned higher degree) of consistency among the data region measurements.

Returning to FIG. 7, as previously mentioned, aggregation levels may be included as part of a set of network identifiers, through the aggregation mapping component 708. These aggregation levels are associated with RNTI values. Control information is transmitted in multiple CCEs. The number of CCEs used to transmit is referred to as the aggregation level. Aggregation levels may be 1, 2, 4 or 8.

The higher the aggregation level the more reliable the transmission, since more CCEs means more redundancy.

An eNB scheduler selects the aggregation level depending on the UE channel quality. Since the channel quality of a UE does not change very fast it may be assumed that the same aggregation level will remain the same for a given RNTI for subsequent subframes. If a UE under heavy interference or otherwise experiences unreliable transmissions, for example, the eNB may increase the aggregation level to 8; in this case, the eNB will likely continue to maintain the aggregation level at 8 for subsequent transmissions of control information to that UE.

As mentioned previously, the aggregation level of a control channel is provided by the control channel decoder 704. These aggregation levels may be stored in the aggregation mapping component 708. The aggregation mapping component 708 associates each of the network identifiers stored in the network identifier memory 706 with an aggregation level.

With reference to FIG. 8, if aggregation levels are included in the set of network identifiers, then at step 806, the UE first searches for the current RNTI value in the list of RNTI values. If the current RNTI value is in the list, the UE checks the aggregation mapping component to determine if the aggregation level corresponding to the current PDCCH matches the aggregation level mapped to the RNTI value. If both the current RNTI value matches an RNTI value in the list, and the aggregation level corresponding to the current RNTI value matches the aggregation level mapped to the matched RNTI, then the UE may employ an increased level of confidence that the PDCCH is valid. If the current RNTI value matches an RNTI value in the list, but the current aggregation level does not match the aggregation level mapped to the matched RNTI value, then the UE may proceed to step 808 and run the validation algorithm having a heightened threshold requirement. Thereafter, if the RNTI is validated by the validation algorithm, the UE may update the aggregation level associated with the RNTI.

Returning to FIG. 7, as previously mentioned, frequency of occurrence may be included as part of a set of network identifiers, through the frequency mapping component 710. The more frequently a RNTI is scheduled, the more likely that the PDCCH using that RNTI is valid.

As mentioned previously, the control channel decoder 704 provides network identifier information, e.g., RNTI values, to the frequency mapping component 710. The frequency mapping component 710 process the information to derive a corresponding frequency of occurrence of network identifiers and associates each of the network identifiers stored in the network identifier memory 706 with a frequency.

With reference to FIG. 8, if frequencies are included in the set of network identifiers, then at step 806, the UE searches for the current RNTI value in the list of RNTI values. If the current RNTI value is in the list, the UE checks the frequency mapping component 710 to obtain the frequency mapped to the RNTI value. The UE then determines a confidence level of validity based on the frequency. For example, if the frequency mapped to the current RNTI value is 1, the UE may be fairly confident that the PDCCH is valid. However, if the mapped frequency is 20, the UE may be highly confident that the PDCCH is valid. Accordingly, the UE may be programmed with one or more frequency thresholds. In a basis configuration, if the mapped frequency satisfies a first threshold, the UE may bypass any validation algorithm and proceed to step 810. If the mapped frequency satisfies a second threshold, but not the first thresholds, the UE may proceed to step 818 and run the validation algorithm with a relaxed threshold. If the mapped frequency does not satisfy either of the first or second thresholds, the UE may proceed to step 808 and run the validation algorithm with heightened threshold.

In an alternative example, or in addition, the list of RNTI values may be used to restrict search space and thereby reduce complexity. For example, in one implementation, control channel element (CCE) On/Off detection (e.g., based on TPR) may be used in combination with the RNTI history to possibly restrict the search space.

For each RNTI value there is a specific subset of search space where the PDCCH would be searched. If the UE is uncertain whether a certain control channel element (CCE) should be included in a search space or not, for example, because the CCE On/Off detection is deemed unreliable on a given CCE, the UE can use the RNTI list. In this case, the UE reviews all of the RNTIs in the list. If there is at least one RNTI whose search space includes the CCE, then the UE includes the CCE in the search space. If the CCE is not included in the search space of any of the RNTIs in the list, the UE may not search over the CCE, unless it meets an alternative criterion (e.g., a minimum TPR, aggregation level, etc).

If present, the aggregation level may also be used to restrict search space. For example, the UE may determine not to search PDCCHs having an aggregation level 1 on certain CCEs based on prior information.

Figure 9:
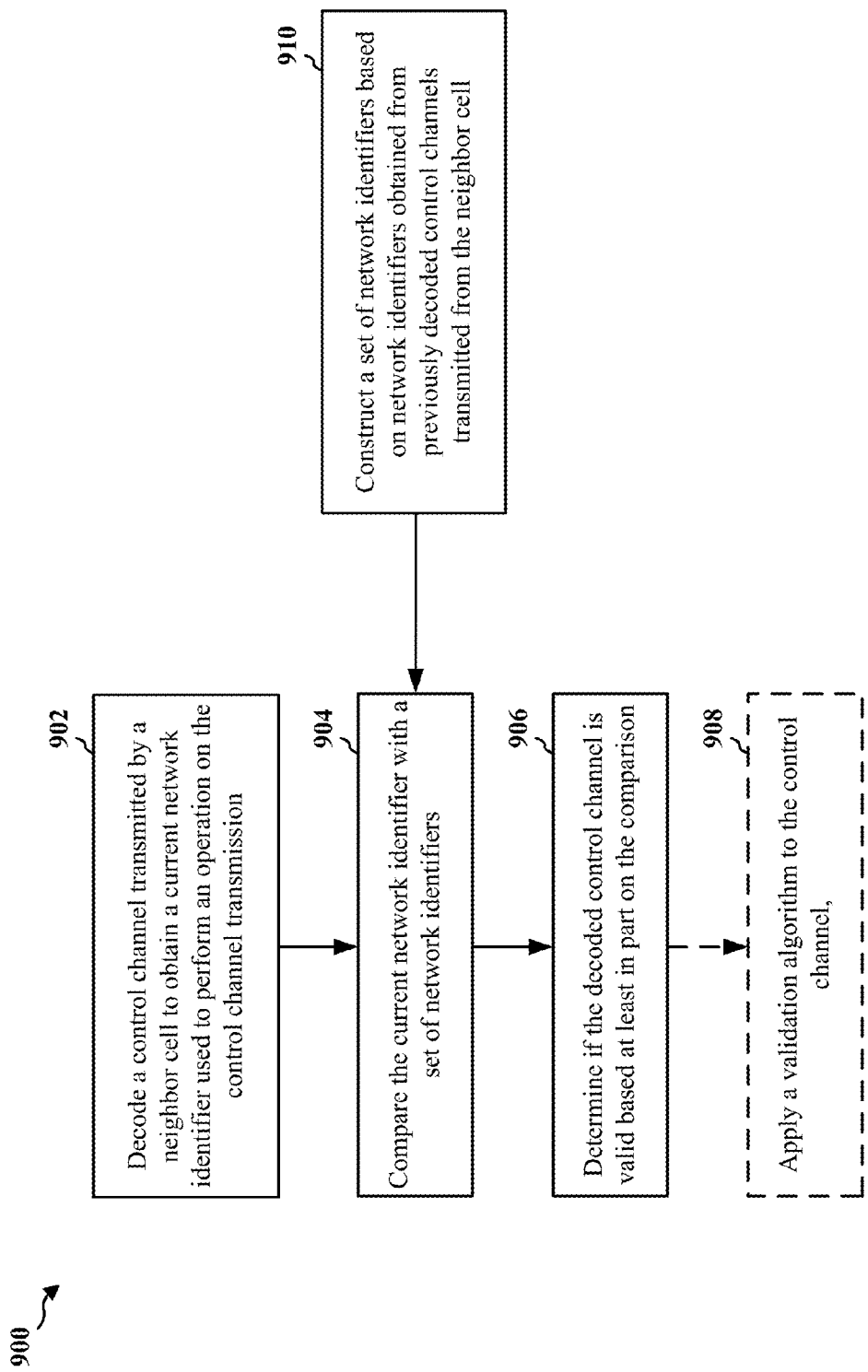
FIG. 9 is a flow chart of a method of wireless communication.

FIG. 9 is a flow chart 900 of a method of wireless communication. The method may be performed by a UE. At step 902, the UE decodes a control channel transmitted by a neighbor cell to obtain a current network identifier used to perform an operation on the control channel transmission. The control channel may be a PDCCH. The current network identifier may be a RNTI. The operations performed using the network identifier may include one or more of encoding, mapping, scrambling, masking, etc.

At step 904, the UE compares the current network identifier with a set of network identifiers. As noted above, the set of network identifiers includes a list of network identifiers, e.g., RNTIs, obtained from previously decoded control channels transmitted from the neighbor cell.

At step 906, the UE determines if the decoded control channel is valid based at least in part on the comparison. For example, the decoded control channel is determined to be valid when the current network identifier matches a network identifier in the list of network identifiers. Alternatively, when the set of network identifiers includes a range of network identifiers, the decoded control channel may be determined to be valid when the current network identifier is within the range.

In another configuration, the UE may determine a current aggregation level for the control channel. The set of network identifiers includes a list of network identifiers obtained from previously decoded control channels transmitted from the neighbor cell and a corresponding aggregation level for each of the network identifiers. The control channel is determined to be valid when the current network identifier matches one of the network identifiers in the list, and the current aggregation level matches an aggregation level corresponding to the matched network identifier.

In yet another configuration, the set of network identifiers includes a list of network identifiers obtained from previously decoded control channels transmitted from the neighbor cell, and a corresponding frequency of occurrence for each of the network identifiers in the list. The control channel is determined valid when the current network identifier matches one of the network identifiers in the list, and the corresponding frequency of occurrence for the matched network identifier satisfies a threshold.

As discussed above, in some examples, the UE may restrict a search space, at least in part, based on the set of network identifiers. For example, in one implementation, control channel element (CCE) On/Off detection (e.g., based on TPR) may be used in combination with the RNTI history to possibly restrict the search space. The set of network identifiers may include a list of network identifiers obtained from previously decoded control channels transmitted from the neighbor cell. If there is at least one RNTI whose search space includes the CCE, then the UE includes the CCE in the search space. If the CCE is not included in the search space of any of the RNTIs in the list, the UE may not search over the CCE, unless it meets an alternative criterion (e.g., a minimum TPR, aggregation level, etc).

Returning to FIG. 9, at optional step 908, the UE applies a validation algorithm to the control channel. The validation algorithm may apply a first validation threshold if the current network identifier is not in the set of network identifiers, and a second threshold if current network identifier is in the set of network identifiers. In one configuration, the second threshold is satisfied more easily than the first threshold. The validation algorithm may be based, at least in part, on one or more of an analysis of the data region corresponding to the control information conveyed by the control channel, and a reliability metric generated through the decoding of the control channel.

At step 910, the UE constructs the set of network identifiers based on network identifiers obtained from previously decoded control channels transmitted from the neighbor cell. In one implementation, the set of network identifiers may be stored in a queue having a bottom and a top. In this case, constructing the set of network identifiers involves removing a previous network identifier from the bottom of the queue when a current network identifier is added to the top of the queue. In another implementation, the set of network identifiers may be stored in memory based on ascending order of identifier value. In this case, constructing the set of network identifiers involves associating a time stamp with each stored network identifier and removing a stored identifier from memory when the time stamp no longer satisfies a time criterion. The time criterion may be a time duration since a network identifier was stored in memory, e.g., remove if time stamp indicates network identifier was recorded more than 12 hours ago.

Figure 10:
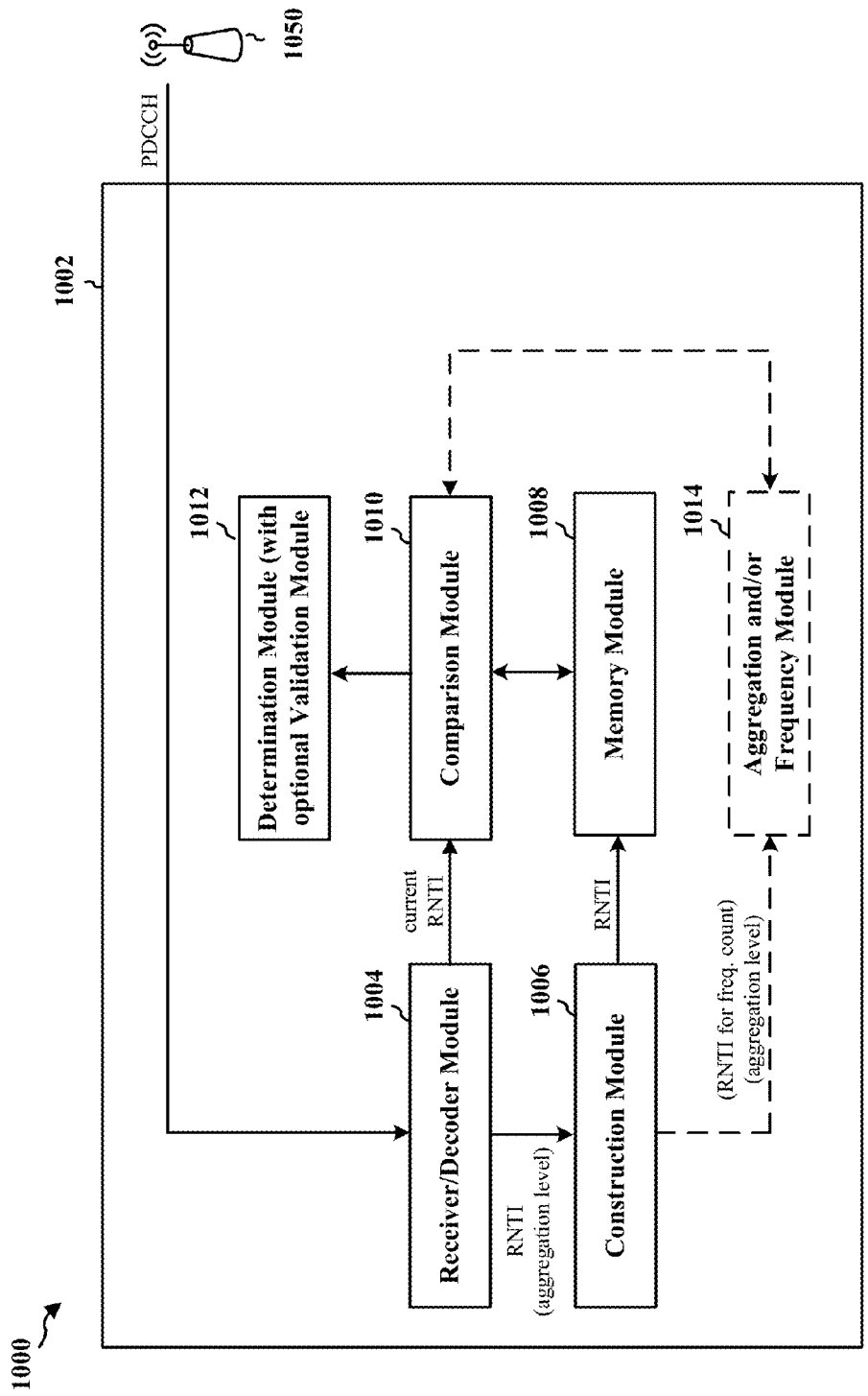
FIG. 10 is a conceptual data flow diagram illustrating the data flow between different modules/means/components in an exemplary apparatus that implements method of FIG. 9.

FIG. 10 is a conceptual data flow diagram 1000 illustrating the data flow between different modules/means/components in an exemplary apparatus 1002. The apparatus may be a UE. The apparatus includes a receiver/decoder module 1004, a construction module 1006, a memory module 1008, a comparison module 1010, a determination module 1012, and an aggregation and/or frequency module 1014.

The receiver/decoder module 1004 receives and decodes a control channel, e.g., PDCCH, transmitted by a neighbor cell to obtain a current network identifier used to perform an operation on the control channel transmission. The control channel may be transmitted by an eNB 1050 in the neighbor cell. The receiver/decoder module 1004 may also determine a current aggregation level for the control channel.

The construction module 1006 constructs a set of network identifiers based on network identifiers, e.g., RNTIs, obtained from previously decoded control channels transmitted from the neighbor cell. The set of network identifiers may be a list of network identifiers, or a range of network identifiers, obtained from previously decoded control channels transmitted from the neighbor cell. The set of network identifiers may further include aggregation level information and frequency of occurrence information. The memory module 1008 stores those aspects of the set of network identifiers corresponding to a list of network identifiers, or a range of network identifiers.

The comparison module 1010 compares a current network identifier with a set of network identifiers. The determination module 1012 determines if the decoded control channel is valid based at least in part on the comparison. The determination module 1012 optionally includes a validation module that applies a validation algorithm to the control channel. The validation algorithm applies a first validation threshold if the current network identifier is not in the set of network identifiers, and a second threshold if current network identifier is in the set of network identifiers.

The aggregation and/or frequency module 1014 stores information that maps aggregation levels to RNTI values and/or frequencies of occurrence to RNTI values.

The apparatus may include additional modules that perform each of the steps of the algorithm in the aforementioned flow charts of FIGS. 8 and 9. As such, each step in the aforementioned flow charts of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
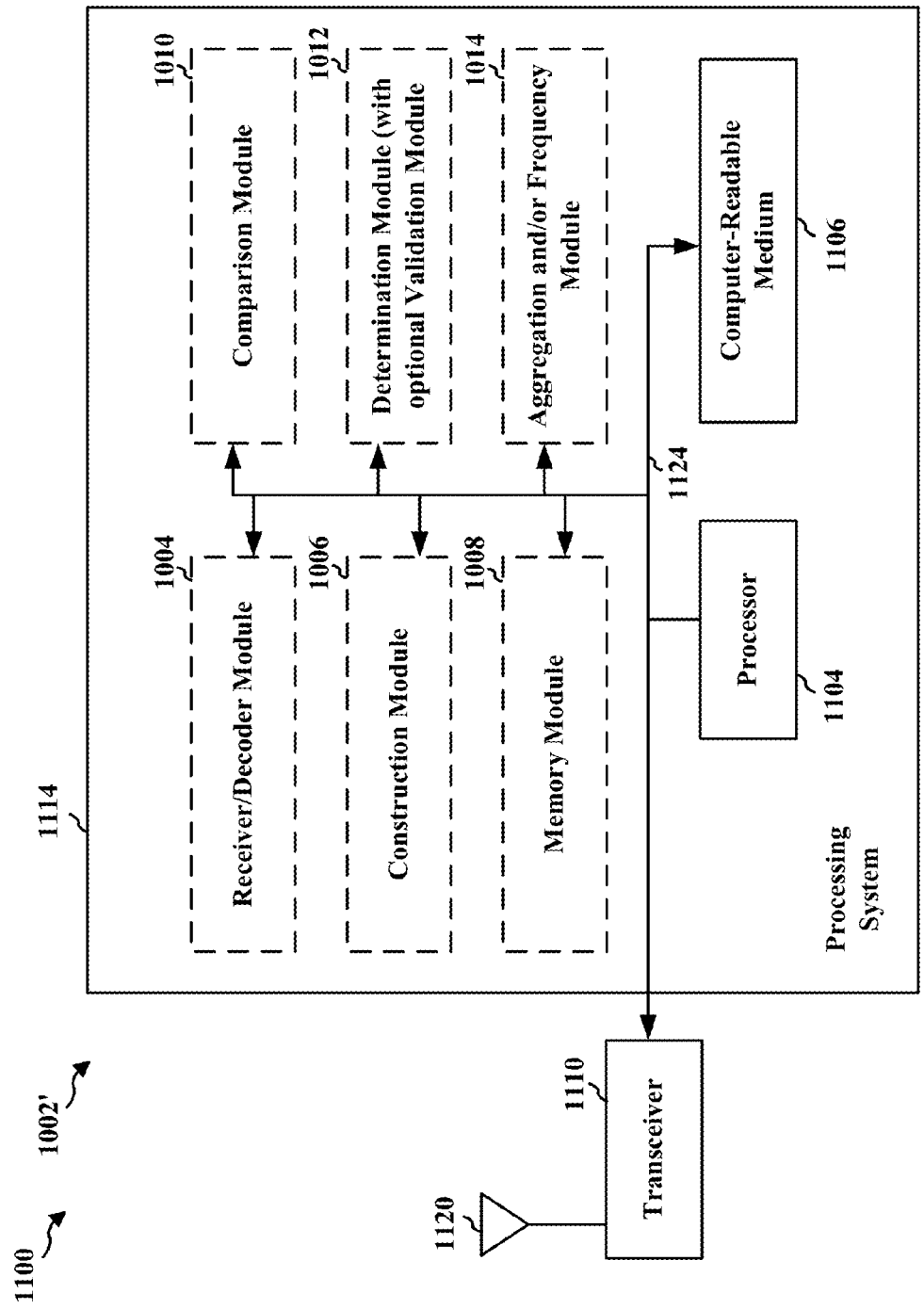
FIG. 11 is a diagram illustrating an example of a hardware implementation for an apparatus employing a processing system that implements method of FIG. 9.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiver/decoder module 1004. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the 1004, 1006, 1008, 1010, 1012 and 1014. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for decoding a control channel transmitted by a neighbor cell to obtain a current network identifier used to perform an operation on the control channel transmission, means for comparing the current network identifier with a set of network identifiers, and means for determining if the decoded control channel is valid based at least in part on the comparison, means for determining a current aggregation level for the control channel, means for determining a frequency of occurrence for each of the network identifiers in a list of network identifiers; means for restricting a search space within which to search for control channels based on the set of network identifiers, means for applying a validation algorithm to the control channel, wherein the validation algorithm applies a first validation threshold if the current network identifier is not in the set of network identifiers, and a second threshold if current network identifier is in the set of network identifiers, and means for constructing the set of network identifiers based on network identifiers obtained from previously decoded control channels transmitted from the neighbor cell.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 12A:
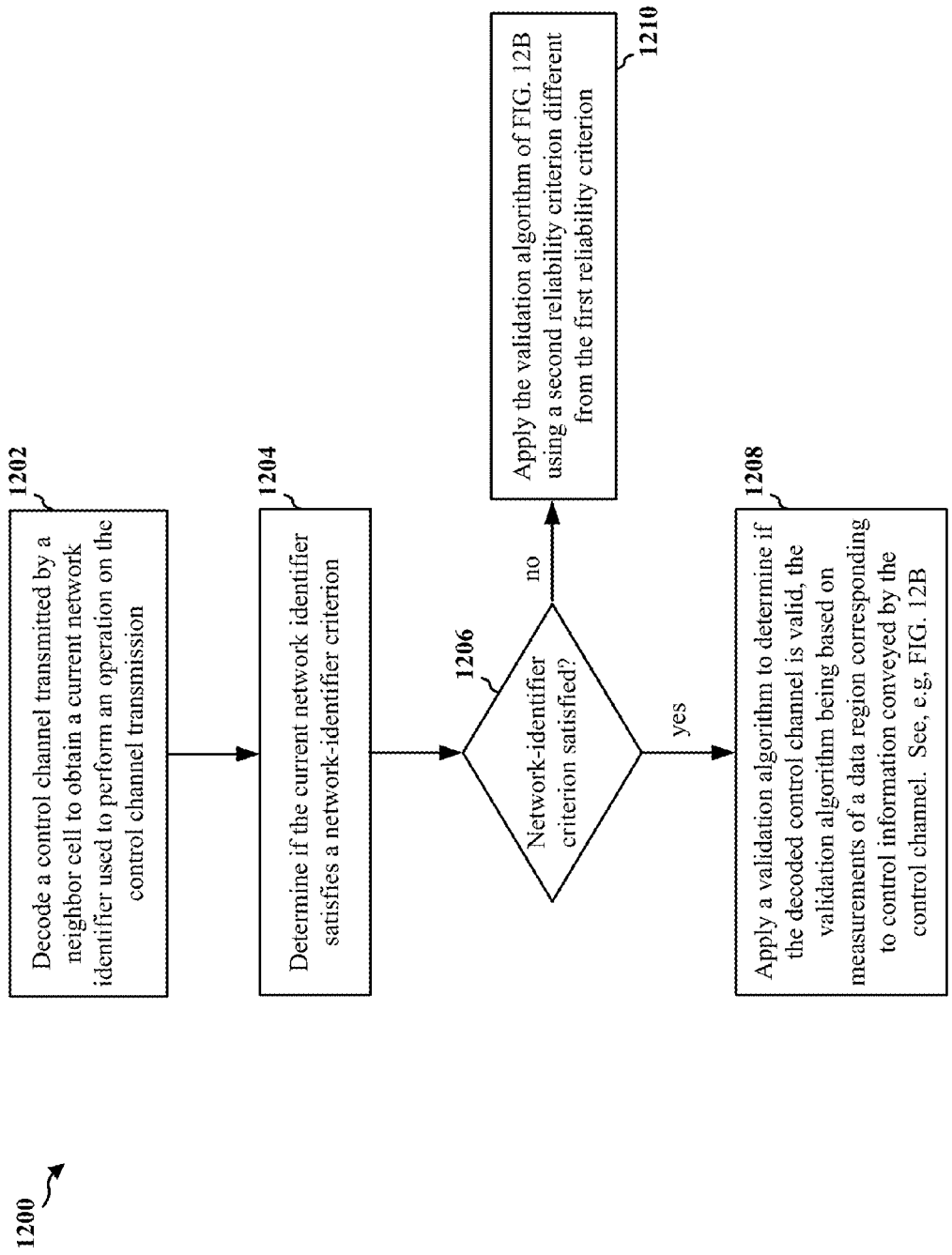
FIG. 12A and FIG. 12B are a flow chart of another method of wireless communication that may be implemented by the apparatuses of FIG. 10 and FIG. 11.
Figure 12B:
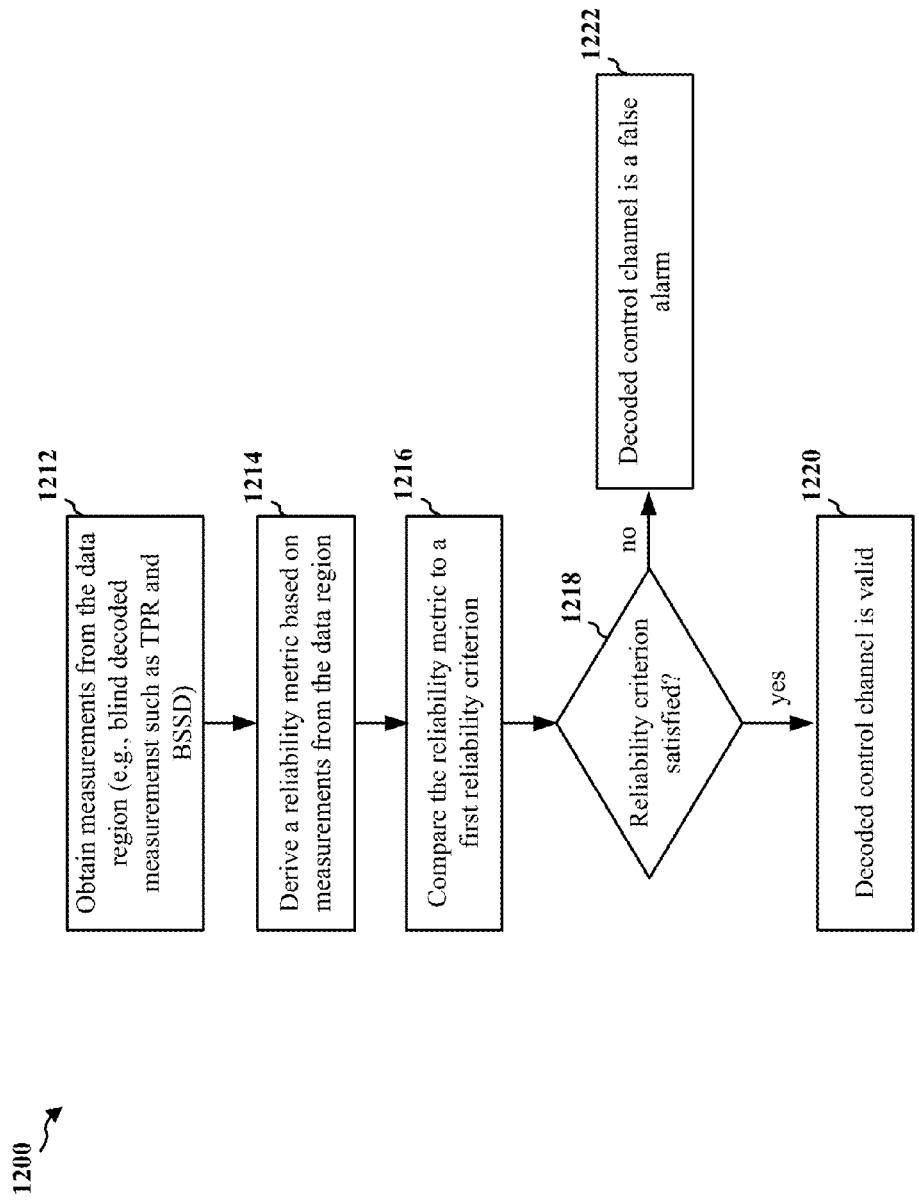

FIG. 12A and FIG. 12B are a flow chart 1200 of a method of wireless communication. The method may be performed by a UE. At step 1202, the UE decodes a control channel transmitted by a neighbor cell to obtain a current network identifier used to perform an operation on the control channel transmission. The control channel may be a PDCCH. The current network identifier may be a RNTI. The operations performed using the network identifier may include one or more of encoding, mapping, scrambling, masking, etc.

At step 1204, the UE determines if the current network identifier satisfies a network-identifier criterion. For example, the network-identifier criterion may be satisfied when the current network identifier matches a network identifier in a list of network identifiers obtained from previously decoded control channels transmitted from the neighbor cell. As another example, the network-identifier criterion may be satisfied when the current network identifier is within a range of network identifiers derived from previously decoded control channels transmitted from the neighbor cell.

The UE may optionally determine a current aggregation level for the control channel. In this case, the network-identifier criterion may be satisfied when the current network identifier matches a network identifier in a list of network identifiers obtained from previously decoded control channels transmitted from the neighbor cell, and the current aggregation level matches an aggregation level corresponding to the matched network identifier.

The UE may optionally determine a frequency of occurrence for network identifiers. In this case, the network-identifier criterion may be satisfied when the current network identifier matches a network identifier in a list of network identifiers obtained from previously decoded control channels transmitted from the neighbor cell, and the corresponding frequency of occurrence for the matched network identifier satisfies a threshold.

If at step 1206, the UE determines that the network-identifier criterion is satisfied, the process proceeds to step 1208, where the UE applies a validation algorithm to determine if the decoded control channel is valid, if the current network identifier satisfies the network-identifier criterion. The validation algorithm is based on measurements of a data region corresponding to control information conveyed by the control channel.

With reference to FIG. 12B, in one implementation of a validation algorithm to determine if the decoded control channel is valid, at step 1212 the UE obtains measurements from the data region corresponding to control information conveyed by the control channel. Measurements of the data region may include blind decoded measurements, such as traffic to power ratio (TPR) measurements or blind spatial scheme detector (BSSD) measurements.

At step 1214 the UE derives a reliability metric based on measurements from the data region.

At step 1216, the UE compares the reliability metric to a first reliability criterion. The reliability criterion may be a statistical measure of substantially constant measurements.

If at step 1218, the first reliability criterion is satisfied, the UE, at step 1220, determines that the decoded control channel is valid. If at step 1218, the first reliability criterion is not satisfied, the UE, at step 1222, determines that the decoded control channel is a false alarm.

As described above, in one example validation algorithm, measurements are derived from information extracted from a data region corresponding to control information conveyed by the control channel, e.g., PUCCH. Initially, a statistical measure of variance in the measurements across the data region is obtained. This measurement corresponds to a reliability metric. The reliability metric is compared to a reliability criterion. For example, the reliability criterion may be a threshold variance in measurements. If the reliability metric is indicative of substantially constant measurements across the data region, then the algorithm concludes the control channel is valid. If the reliability metric is indicative of varying, e.g., oscillating, measurements across the data region, then the algorithm concludes the control channel is invalid, i.e., is a false alarm.

Returning to FIG. 12A, if at step 1206, the UE determines that the network-identifier criterion is not satisfied, the process proceeds to step 1210, where the UE applies the validation algorithm of FIG. 12B using a second reliability criterion different from the first reliability criterion. The second reliability metric may correspond to a higher threshold relative to the first reliability metric and thus may be more difficult to satisfy.

The method of FIG. 12A and FIG. 12B may be implemented by the apparatuses of FIG. 10 and FIG. 11. For example, the step 1202 of decoding a control channel transmitted by a neighbor cell to obtain a current network identifier used to perform an operation on the control channel transmission may be performed by a receiver/decoder module 1004/1004'. The step 1204 of determining if the current network identifier satisfies a network-identifier criterion may be performed by one or more of the construction module 1006/1006', the memory module 1008/1008' and the comparison module 1010/1010'. The steps 1208 and 1210 of applying a validation algorithm to determine if the decoded control channel is valid, may be performed by the determination module 1012/1012'.

In one configuration, the apparatus 1002/1002' for wireless communication for implementing the method of FIG. 12A and FIG. 12B includes means for decoding a control channel transmitted by a neighbor cell to obtain a current network identifier used to perform an operation on the control channel transmission, means for determining if the current network identifier satisfies a network-identifier criterion, and means for applying a validation algorithm to determine if the decoded control channel is valid if the current network identifier satisfies the network-identifier criterion, the validation algorithm being based on measurements of a data region corresponding to control information conveyed by the control channel. The aforementioned means may be one or more of the aforementioned modules of the apparatus 1002 and/or the processing system 1114 of the apparatus 1002' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment, comprising:
   decoding a control channel transmitted by a neighbor cell to obtain a current network identifier used to perform an operation on the control channel;
   determining if the current network identifier satisfies a network-identifier criterion;
   applying a validation algorithm when the current network identifier satisfies the network-identifier criterion, wherein the validation algorithm determines if the decoded control channel was successfully decoded based on measurements of a data region corresponding to control information in the decoded control channel, and wherein applying the validation algorithm comprises:
      deriving a first reliability metric based on measurements from the data region;
      comparing the first reliability metric to a reliability criterion; and
      determining the decoded control channel is valid when the reliability criterion is satisfied; and
   applying the validation algorithm using a second reliability metric to determine if the decoded control channel is valid, if the current network identifier does not satisfy the network-identifier criterion;
   transferring the decoded control channel to upper layers for further processing, when the decoded control channel is determined to be valid based on the validation algorithm.

2. The method of claim 1, wherein the decoded control channel is a physical downlink control channel (PDCCH), and the current network identifier is a radio network temporary identifier (RNTI).

3. The method of claim 1, wherein the network-identifier criterion is satisfied when the current network identifier matches a network identifier in a list of network identifiers obtained from previously decoded control channels transmitted from the neighbor cell.

4. The method of claim 1, wherein the network-identifier criterion is satisfied when the current network identifier is within a range of network identifiers derived from previously decoded control channels transmitted from the neighbor cell.

5. The method of claim 1, further comprising:
   determining a current aggregation level for the control channel,
   wherein the network-identifier criterion is satisfied when the current network identifier matches a network identifier in a list of network identifiers obtained from previously decoded control channels transmitted from the neighbor cell, and the current aggregation level matches an aggregation level corresponding to the matched network identifier.

6. The method of claim 1, further comprising:
   determining a frequency of occurrence for network identifiers,
   wherein the network-identifier criterion is satisfied when the current network identifier matches a network identifier in a list of network identifiers obtained from previously decoded control channels transmitted from the neighbor cell, and the corresponding frequency of occurrence for the matched network identifier satisfies a threshold.

7. The method of claim 1, wherein the reliability criterion comprises a statistical measure of substantially constant measurements.

8. The method of claim 1, wherein the measurements of the data region comprise blind decoded measurements.

9. The method of claim 8, wherein the blind decoded measurements comprise one or more of:
traffic to power ratio (TPR) measurements, or
blind spatial scheme detector (BSSD) measurements.

10. An apparatus for wireless communication, comprising:
means for decoding a control channel transmitted by a neighbor cell to obtain a current network identifier used to perform an operation on the control channel;
means for determining if the current network identifier satisfies a network-identifier criterion; and
means for applying a validation algorithm when the current network identifier satisfies the network-identifier criterion, wherein the validation algorithm determines if the decoded control channel was successfully decoded based on measurements of a data region corresponding to control information in the decoded control channel, and wherein the means for applying the validation algorithm is configured to:
derive a first reliability metric based on measurements from the data region;
compare the first reliability metric to a reliability criterion; and
determine the decoded control channel is valid when the reliability criterion is satisfied; and
means for applying the validation algorithm using a second reliability metric to determine if the decoded control channel is valid, if the current network identifier does not satisfy the network-identifier criterion;
means for transferring the decoded control channel to upper layers for further processing, when the decoded control channel is determined to be valid based on the validation algorithm.

11. The apparatus of claim 10, wherein the decoded control channel is a physical downlink control channel (PDCCH), and the current network identifier is a radio network temporary identifier (RNTI).

12. The apparatus of claim 10, wherein the network-identifier criterion is satisfied when the current network identifier matches a network identifier in a list of network identifiers obtained from previously decoded control channels transmitted from the neighbor cell.

13. The apparatus of claim 10, wherein the network-identifier criterion is satisfied when the current network identifier is within a range of network identifiers derived from previously decoded control channels transmitted from the neighbor cell.

14. The apparatus of claim 10, further comprising:
means for determining a current aggregation level for the control channel,
wherein the network-identifier criterion is satisfied when the current network identifier matches a network identifier in a list of network identifiers obtained from previously decoded control channels transmitted from the neighbor cell, and the current aggregation level matches an aggregation level corresponding to the matched network identifier.

15. The apparatus of claim 10, further comprising:
means for determining a frequency of occurrence for network identifiers,
wherein the network-identifier criterion is satisfied when the current network identifier matches a network identifier in a list of network identifiers obtained from previously decoded control channels transmitted from the neighbor cell, and the corresponding frequency of occurrence for the matched network identifier satisfies a threshold.

16. The apparatus of claim 10, wherein the reliability criterion comprises a statistical measure of substantially constant measurements.

17. The apparatus of claim 10, wherein the measurements of the data region comprise blind decoded measurements.

18. The apparatus of claim 17, wherein the blind decoded measurements comprise one or more of:
traffic to power ratio (TPR) measurements, or
blind spatial scheme detector (BSSD) measurements.

19. An apparatus for wireless communication, comprising:
a memory; and
at least one processor coupled to the memory and configured to:
decode a control channel transmitted by a neighbor cell to obtain a current network identifier used to perform an operation on the control channel;
determine if the current network identifier satisfies a network-identifier criterion;
apply a validation algorithm to determine if the decoded control channel is valid if the current network identifier satisfies the network-identifier criterion, the validation algorithm being based on measurements of a data region corresponding to control information conveyed by the control channel, wherein the at least one processor is configured to apply the validation algorithm by:
deriving a first reliability metric based on measurements from the data region;
comparing the first reliability metric to a reliability criterion; and
determining the decoded control channel is valid when the reliability criterion is satisfied; and
apply the validation algorithm using a second reliability metric to determine if the decoded control channel is valid, if the current network identifier does not satisfy the network-identifier criterion;
transferring the decoded control channel to upper layers for further processing, when the decoded control channel is determined to be valid based on the validation algorithm.

20. The apparatus of claim 19, wherein the reliability criterion comprises a statistical measure of substantially constant measurements.

21. The apparatus of claim 19, wherein the measurements of the data region comprise blind decoded measurements.

22. The apparatus of claim 21, wherein the blind decoded measurements comprise one or more of:
traffic to power ratio (TPR) measurements, or
blind spatial scheme detector (BSSD) measurements.

23. A non-transitory computer-readable medium storing computer executable code, comprising code to:
decode a control channel transmitted by a neighbor cell to obtain a current network identifier used to perform an operation on the control channel;
determine if the current network identifier satisfies a network-identifier criterion;
apply a validation algorithm to determine if the decoded control channel is valid if the current network identifier satisfies the network-identifier criterion, the validation algorithm being based on measurements of a data region corresponding to control information conveyed by the control channel, wherein the code to apply the validation algorithm is configured to:

derive a first reliability metric based on measurements from the data region;

compare the first reliability metric to a reliability criterion; and determine the decoded control channel is valid when the first reliability criterion is satisfied; and apply the validation algorithm using a second reliability metric to determine if the decoded control channel is valid, if the current network identifier does not satisfy the network-identifier criterion;

transfer the decoded control channel to upper layers for further processing, when the decoded control channel is determined to be valid based on the validation algorithm.

24. The non-transitory computer-readable medium of claim 23, wherein the measurements of the data region comprise blind decoded measurements.

\* \* \* \* \*